Sept. 12, 1950 U. C. HAREN 2,522,359
APPARATUS FOR VULCANIZING ENDLESS ARTICLES
Filed Oct. 27, 1948 3 Sheets-Sheet 1

Inventor
Urban C. Haren
By
Atty

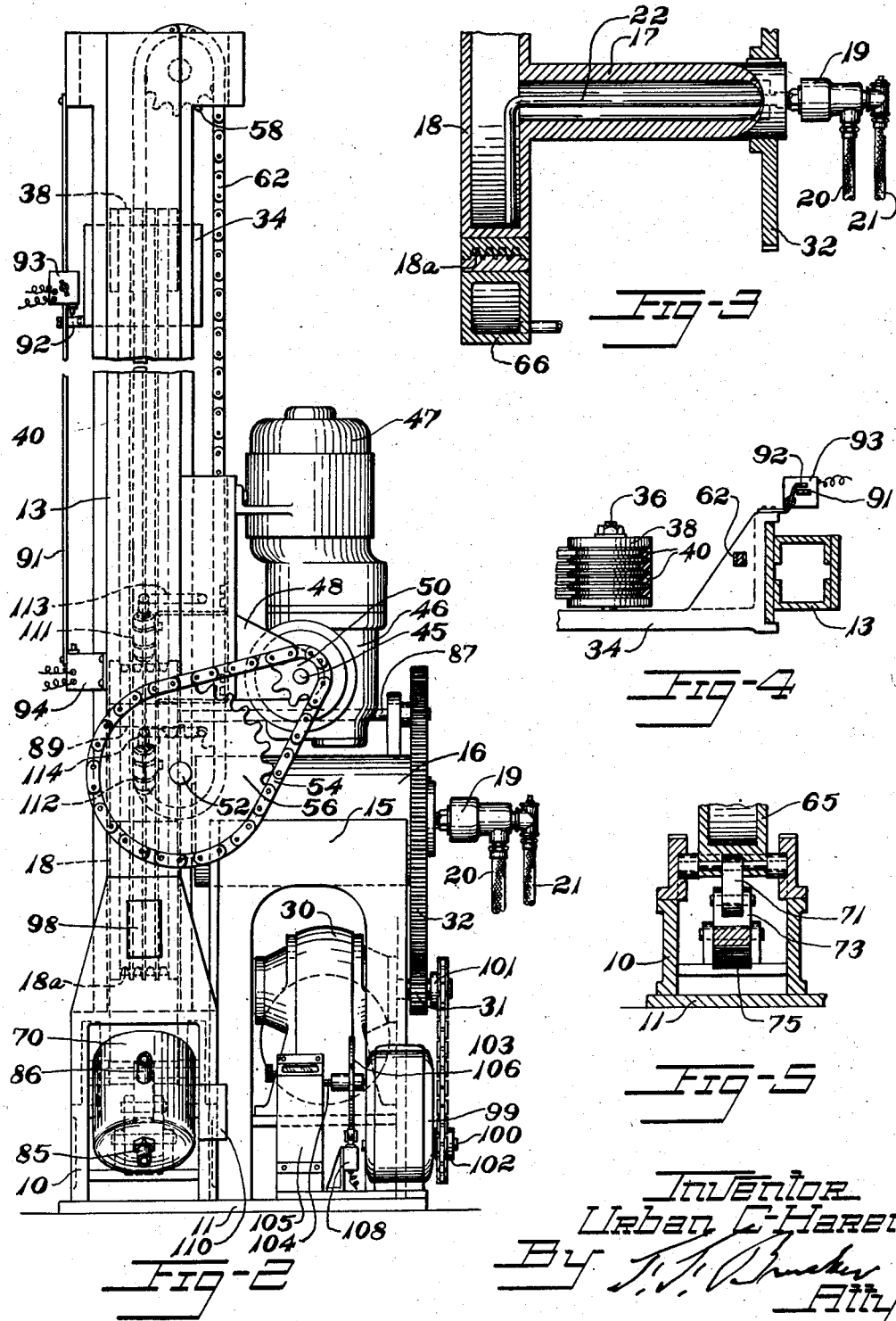

Patented Sept. 12, 1950

2,522,359

UNITED STATES PATENT OFFICE 2,522,359

APPARATUS FOR VULCANIZING ENDLESS ARTICLES

Urban C. Haren, Akron, Ohio, assignor to The B. F. Goodrich Company, New York, N. Y., a corporation of New York Application October 27, 1948, Serial No. 56,715

12 Claims. (Cl. 18—6)

This invention relates to the vulcanizing of endless articles such as transmission belts, and is especially useful in the manufacture of belts for multiple belt drives where it is desirable to vulcanize the belts as a set although the invention is also useful in vulcanizing single belts or other endless band articles.

In the manufacture of multiple belt drive members, difficulty has been experienced in making all of the belts of a set of the same length and having the same stretch characteristics throughout. In apparatus heretofore proposed for vulcanizing such belts, it has been difficult to load and unload the vulcanizer.

Where V-belts of long lengths were required it has been proposed to vulcanize the belts step-by-step but this has heretofore required considerable hand manipulation requiring constant attendance of the operator.

Where belts are vulcanized step-by-step it has also been found that the belts varied in stretch characteristics in different parts thereof.

It is an object of the present invention to overcome the foregoing and other difficulties.

Other objects are to provide for vulcanizing a belt step-by-step in a manner to provide uniform stretch characteristics throughout the belt, to provide improved means for simultaneously vulcanizing a plurality of belts of uniform length, to provide sequence control of the vulcanizing apparatus, to provide ease of loading and unloading the apparatus, and to provide an improved product.

These and other objects will appear from the following description and the accompanying drawings.

Of the drawings:

Fig. 2 is a side elevation thereof.

Fig. 3 is a sectional view thereof taken on line 3—3 of Fig. 1.

Fig. 4 is a sectional view taken on line 4—4 of Fig. 1.

Fig. 5 is a sectional view taken on line 5—5 of Fig. 1.

Figure 1:
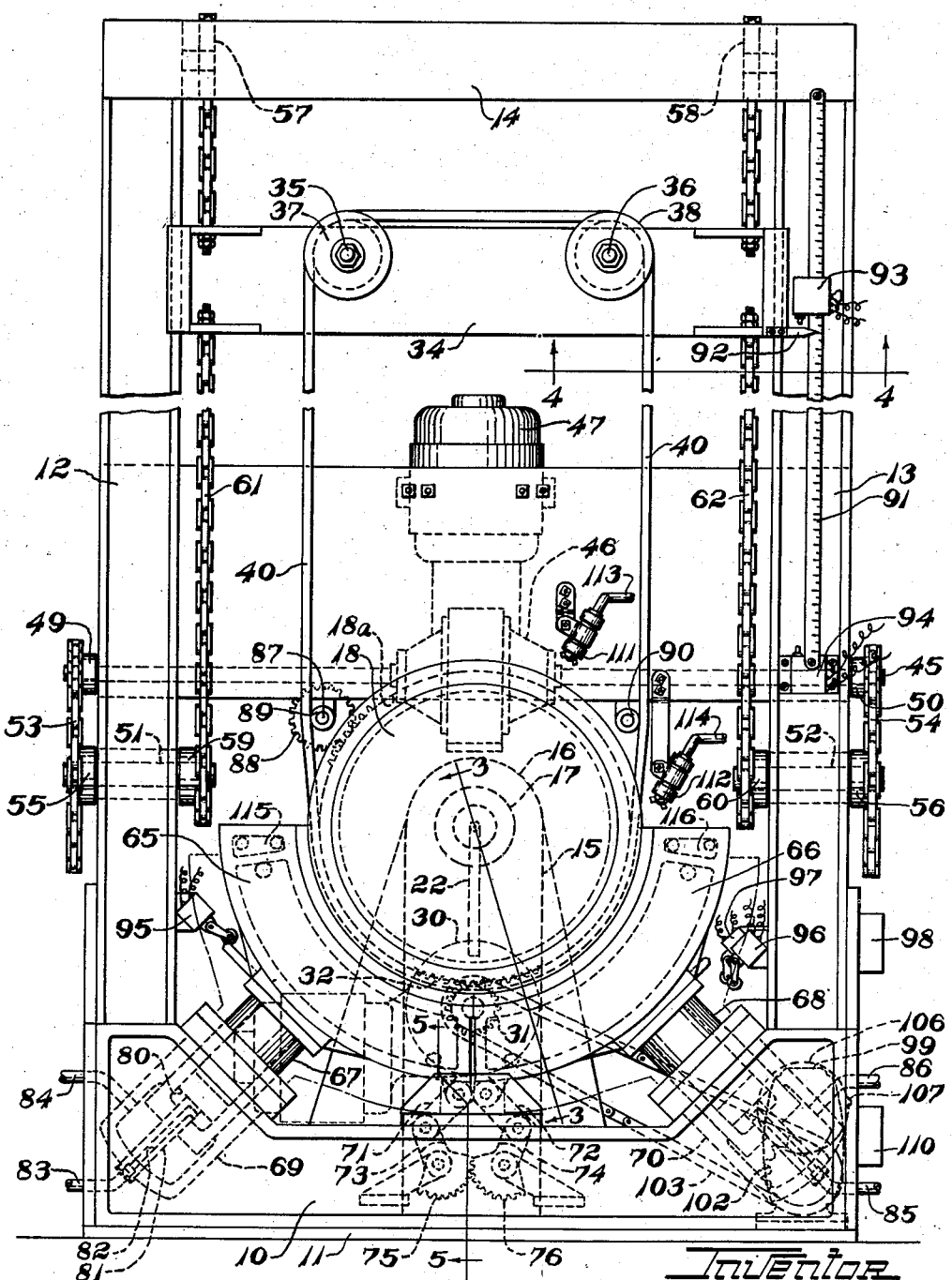
Fig. 1 is a front elevation of apparatus constructed in accordance with and embodying the invention.

Referring to the drawing, the numeral 10 designates a cross frame member mounted upon a base plate 11 and supporting a pair of columns 12, 13 which are joined at their upper ends by a beam 14.

A frame 15 is fixed to base plate 11 and has a bearing 16 in which a hollow shaft 17 is rotatably mounted on a horizontal axis. A curing drum 18 is integral with the shaft 17. The drum is hollow so as to contain steam or other heating fluid and connects with the hollow shaft. For circulating the heating fluid, a mill-T 19 is secured at the end of the shaft and has flexible pipes 20, 21 connecting therewith. The pipe 20 connects a steam line to the interior of the shaft and the pipe 21 connects to a pipe 22 which extends axially through the shaft and is bent to enter the lowest part of the drum and connect it to an exhaust line.

For driving the drum, a motor 30 is mounted on the frame 15 and has a pinion 31 which engages a bull gear 32 fixed to shaft 17.

The drum 18 may have a cylindrical face for vulcanizing flat belting, but where V-belts or other belts for use in grooved pulleys are to be cured, the drum is provided with one or more circumferential grooves 18ª corresponding thereto.

For tensioning the belts, a cross rail 34 is slideably mounted for vertical movement on columns 12, 13 and supports a pair of studs 35, 36 on which a pair of pulleys 37, 38 are rotatably mounted. Where the drum 18 is grooved, the pulleys 37, 38 are grooved correspondingly to align one or more belts 40 trained thereabout and about the drum 18. The rail 34 may be raised to tension the belts or lowered to relieve the tension and permit removal thereof. For this purpose a horizontal shaft 45 is mounted on a speed reducer 46 driven by a reversible motor 47, and is journaled in bearings 48 on frame 15. Sprockets 49, 50 are fixed to the shaft. A pair of horizontal shafts 51, 52 are journaled on columns 12, 13 respectively and are driven from shaft 45 as by chains 53, 54 engaging sprockets 49, 50 and sprockets 55, 56 fixed respectively to shafts 51, 52. Idler sprockets 57, 58 are rotatably mounted on cross rail 14 in alignment with sprockets 59, 60 fixed respectively to shafts 51, 52. Chains 61, 62 are looped about the upper and lower sprockets 57, 58 and 59, 60 and are attached to rail 34. The arrangement is such that rail 34 may be lowered or raised by motor 47.

For pressing the belts against the drum 18, a pair of arcuate heating shoes 65, 66 complementarily extend about the lower half of the drum and are mounted for movement radially toward and from the drum by rams 67, 68 fitted in hydraulic cylinders 69, 70. The rams are operated in unison and to insure such operation, the shoes 65, 66 are pivotally connected to links 71, 72 which in turn are connected to levers 73, 74 pivotally mounted on cross-frame member 10. The levers 73, 74 have segmental gears 75, 76 integral therewith and meshing with each other.

Each ram 67, 68 is arranged to be moved by hydraulic pressure toward and away from drum 18 and for this purpose a cylinder bore is formed in the ram to fit a piston 80 attached by a rod 81 to the end of the cylinder 69. A passage 82 is provided through the rod to the inner cylinder for admission of pressure fluid from a pipe 83 to retract the ram. A second pipe 84 admits pressure fluid to the outer cylinder 69 to advance the ram. Cylinder 70 is similarly provided with pipes 85, 86 for supplying pressure fluid.

Where it is desired to vulcanize V-belts and the drum 18 is grooved it is desirable to arrange for positive separation of the belts from the grooves as they leave the drum 18. For this purpose a shaft 87 is journaled on the frame of the apparatus and has a pinion 88 fixed thereto and meshing with gear 32 and a roller 89 fixed thereto for contacting the belt 40 at a position close to the face of the drum 18 and deflecting it away from the groove. As the reach of belt between the drum 18 and the roller 89 is relatively short and the belt is relatively stiff, the roller 89 acts to strip the belt from the groove of the drum. A similar idler roller 90 may be provided to deflect the belts at the position where they engage the opposite margin of the drum.

For spraying a liquid on the face of the drum 18 to decrease adhesion of the belts thereto, spray guns 111, 112 are mounted on the frame near the face of the drum and are connected by solenoid-operated valves to a source of liquid under pressure supplied therefrom by pipes 113, 114.

The shoes 65, 66 have steam cavities for heating them and may have cavities 115, 116 at their upper ends for cooling the ends thereby reducing the marking of the belts at the ends of successive step cures.

For measuring the amount of stretch applied to the belts, a scale 91 is mounted on the frame parallel to column 13 and a pointer 92 is mounted on rail 34 for indicating the position of the rail.

For limiting movement of rail 34, a limit switch 93 is adjustably mounted on the scale 91 and connected to the control circuit of motor 47 which controls movement of the rail. The switch is normally closed and is opened by contact with pointer 92. A similar normally closed limit switch 94 is mounted on column 13 and is engaged by the pointer at its most lowered position to open and thereby stop the motor 47 before rail 34 interferes with drum 18.

In the operation of the apparatus, with the shoes 65, 66 and the rail 34 lowered, belts are placed about the drum 18 and about tension pulleys 37, 38. The rail 34 is then raised to tention the belts. The shoes 65, 66 are then advanced against the drum 18, and vulcanization of the pressed portion takes place. The shoes are then lowered and the drum rotated until the cured portion of the belts reaches a position just short of the pressing range and another cure is made slightly overlapping the first. This is repeated until the entire belt is cured. If desired the rail 34 may be raised slightly between successive cures to progressively apply tension to the belts.

To prevent operation of motor 30 except when the shoes 65, 66 are lowered out of contact with the belts and drum 18, a normally closed limit switch 95, in the control circuit of motor 30, may be mounted on the frame in a position to be contacted and opened by the shoe 65 as the shoe contacts it in its advancing movement. This switch may be connected in the circuit of motor 30 to prevent rotation of drum 18 except when the switch is closed.

The operation of spray heads 111, 112 may be controlled so as to spray only when the shoes 65, 66 are retracted and the drum 18 is rotating. For this purpose the spray heads may be operated by a solenoid controlled valve and a normally open limit switch 96 may be mounted on column 13 in a position to be closed by contact with shoe 66 when the shoe is lowered. Closing of the switch energizes the solenoid and operates the spray only when the shoes are retracted. This switch also preferably is connected in the control circuit of motor 30 so as simultaneously to start the motor and sprays.

When it is desired to start the motor 47 to raise the rail 34 simultaneously with retraction of shoes 65, 66, a normally open limit switch 97 may also be mounted on the column 13 in position to be closed by contact with shoe 66 in its retracted position. This switch may simultaneously start an automatic timer 98 for controlling operation of motor 47 in its stretching movements.

Provisions may be made for controlling the angle of rotation of the drum 18 so that the corresponding arc of such angle is a factor of the length of the belts and thereby provides for curing the belts uniformly. For this purpose a variable speed reducer 99 is mounted on base plate 11 and its shaft 100 is driven by motor 30 through sprockets 101, 102 and chain 103. The speed reducer drives a shaft 104 which drives a visual counter 105 and also a cam disc 106. Cam disc 106 has a projection 107 on its periphery in position to depress and operate at limit switch 108 mounted on base plate 11. Switch 108 has normally closed contacts in the control circuit of solenoid 142 controlling current to motor 30 and when depressed stops motor 30. It also stops operation of the spray heads 111, 112 simultaneously with stopping of the motor 30 and has normally open contacts in the circuit of the timer drive motor and clutch closing of which starts operation of a timer 110 which controls the length of cure and the dwell of the shoes 65, 66 against drum 18.

Figure 6:
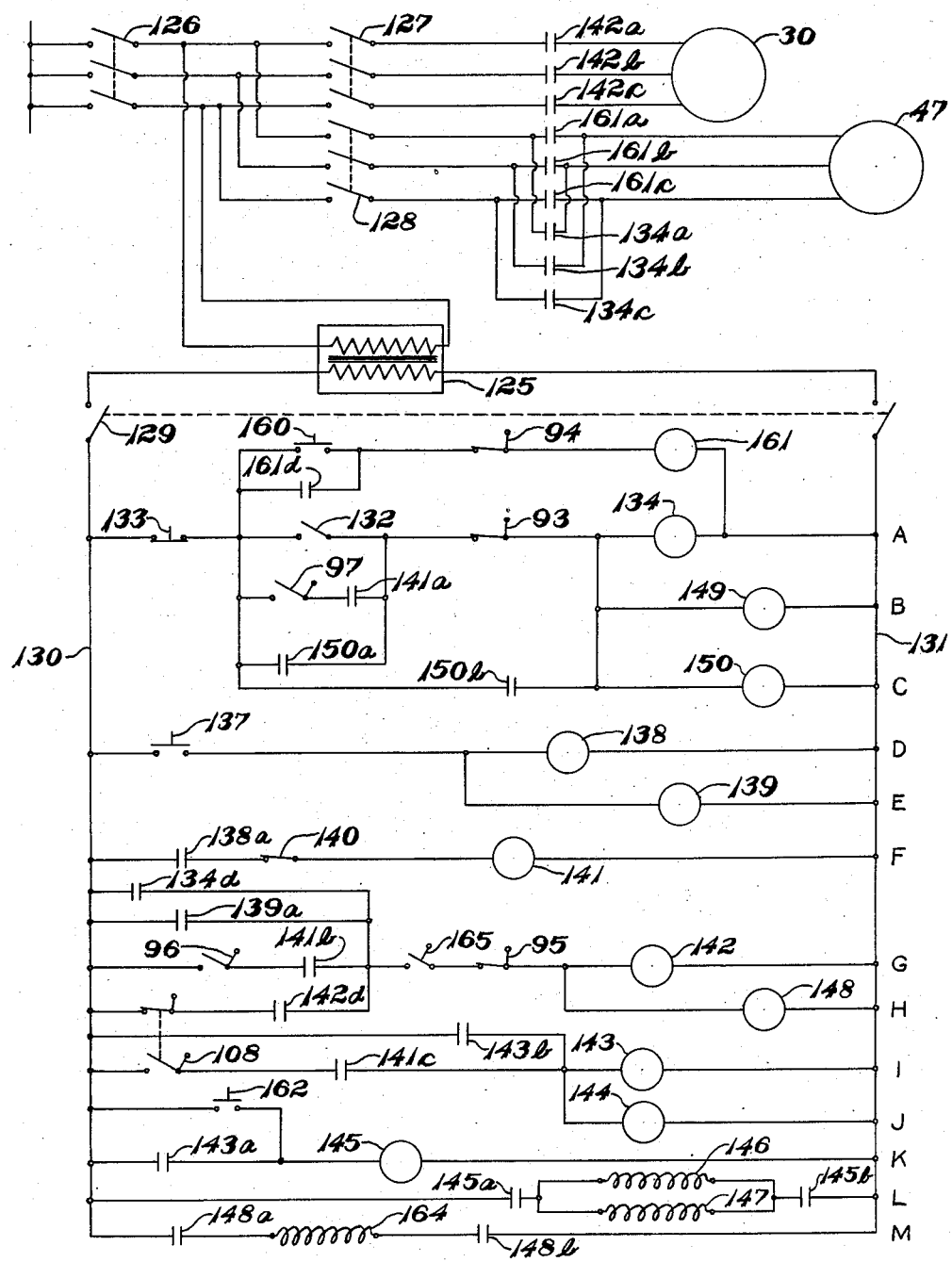
Fig. 6 is a diagrammatic wiring diagram of the apparatus.

While the various moving instrumentalities of the apparatus may be operated at will by hand controlled switches and valves it is desirable to provide for sequence control of the apparatus so that the operator may devote his entire time to loading and unloading the apparatus and regulating the curing temperature making possible operation of a plurality of vulcanizing machines by a single operator. The schematic wiring diagram for such automatic control is shown in Fig. 6 and is as follows:

Power is supplied to motors 30 and 47 and also to a transformer 125 by a three wire high voltage supply through a hand operated main switch 126 and branch cut-out switches 127, 128 to the circuits of motors 30, 47 respectively. The transformer 125 has a reduced voltage secondary which through a cut-out switch 129 supplies current to the main lines 130, 131 of the control circuit. For convenience the branch circuits from line 130 to 131 have been designated by letters A to M. The arrangement of solenoids and solenoid and manually operated switches in these branch circuits will be more readily understood from a description of their operation which is as follows:

As indicated in the wiring diagram, limit switches 93 and 94, previously described are both closed and the rail 34 is at a position between its upper and lower travel limits so that belts may be placed about the drum 18 and pulleys 37, 38, the shoes 65, 66 being retracted with switch 95 closed and switches 96 and 97 held open, and drum 18 is not rotating. In this position of the parts, no current passes through any of the branch circuits. After the belts are placed about the drum 18 and pulleys 37, 38, a manually operated switch 132 in branch circuit A is closed and current flows through circuit A from line 130 to 131 by way of normally closed push-button stop switch 133, switch 132, closed limit switch 93, and a solenoid 134, thereby energizing the solenoid 134. Solenoid 134 closes contactors 134a, 134b, 134c in the circuit to motor 47 causing the motor to run in a direction to raise the rail 34 and tension the belts. When the rail has raised the desired amount, the switch 132 is opened, otherwise the rail would rise until switch 93 opened. Switch 93 may be previously set for the correct stretch. Opening of manually operated switch 132 sets the raise section of circuit A for automatic operation.

Energizing of solenoid 134 also closes a switch 134d in a shunt line of circuits G and H which control respectively the drum rotating motor 30 and the spray valves through the manually operated switch 165, now open. Switch 165 prevents starting of drum rotating motor 30 during the initial stretching operation. As solenoid 134 is now deenergized by the opening of switch 132 and switch 134d is now open, switch 165 may now be closed without starting of motor 30.

The operator then closes a normally open push button switch 137 in circuit D, momentarily energizing solenoids 138 and 139. Solenoid 138 closes a switch 138a in circuit F, energizing, through a manually operated switch 140 previously closed, a solenoid 141. Switch 138a is of the mechanically latched-in type and stays closed until unlatched at the end of the cycle of operation. The switch 140 is for the purpose of setting the circuit F for automatic operation. The momentary energizing of solenoid 139 by closing switch 137 closes a normally open switch 139a in circuits G and H, shutting switch 134d, now open, and energizing solenoids 142 and 148 to start the drum rotating motor 30 and the sprays simultaneously.

Energizing of solenoid 141, the purpose of which is to set up circuits A, B, C, G, H, I and J for automatic operation, closes a switch 141a in circuits A, B, and C, and as long as switches 132 and 97 are open, no immediate movement of rail 34 takes place. At the same time a switch 141b in circuits G and H is closed, but until switch 96 is closed by movement of the heating shoes 65, 66 in retracting, no rotation of the drum 18 occurs. Also, at the same time, a switch 141c closes in circuits I and J which control the motor and clutch of timer 110, but until the contacts of switch 108 in circuits I, J are closed by timer cam 106, the timer 98 does not start.

Energizing of solenoid 139 having energized the drum rotating circuit through switch 139a, solenoid 142 in that circuit closes switches 142a, 142b, 142c in the circuit of motor 30 starting the motor 30 which rotates the drum 18 and cam 106, and also closes a switch 142d in a holding circuit of circuit G, thereby assuring rotation of the drum 18 and cam 106 until the cam opens switch 108 in that circuit, stopping rotation of drum 18 and simultaneously closes its contacts in circuit I. When that occurs, switch 141c being closed, switch 108 causes solenoids 143, 144 to be energized in circuits I and J starting timer 110 by control of its motor and clutch. Solenoid 143, when energized, also closes a switch 143a in circuit K, energizing a solenoid 145. It also closes a switch 143b in a holding circuit about switches 108 and 141c. Solenoid 145 closes switches 145a, 145b in circuit L energizing solenoids 146, 147 of the valves controlling cylinders 69, 70 and advancing the shoes 65, 66 against the drum 18.

The heater shoes remain in contact with drum 18 throughout a curing period for which the timer 110 has been set, at which point, the timer 110 opens switch 143a, deenergizing solenoid 145, deenergizing solenoids 146, 147 and shoes 65, 66 are retracted.

As the shoes are retracted, they permit switches 96, 97 to close momentarily. The closing of switch 96 again starts motor 30 and the spray valves by energizing solenoids 142, 148. Closing of switch 97 energizes solenoid 134 which operates the motor 47 in a direction to raise rail 34, and also energizes solenoids 149, 150 to start timer 98 which controls raising of rail 34 by successive increments between cures. Solenoid 150 closes a switch 150a in a holding circuit about switches 132 and 97 and also a switch 150b in a holding circuit about switches 93 and 132 to keep solenoids 149, 150 energized. After a period of raising movement for which timer 98 has been set, the timer opens switches 150a, 150b to stop the stretcher motor 47.

For lowering the rail 34 to remove the cured belts, a normally open push-button switch 160 is provided in a shunt circuit of circuit A which includes limit switch 94 and a solenoid 161. Manual closing of switch 160 energizes solenoid 161 which closes switches 161a, 161b, 161c to start motor 47 in a reverse direction, and simultaneously closes a switch 161d in a holding circuit about the push-button 160. The rail 34 is lowered until the operator opens normally closed push-button switch 133 or the lowering pointer 92 opens limit switch 94. Upon the occurring of either the rail stops.

If it is desired to move the heating shoes 65, 66 toward and from the drum independent of the operation of the timer a manually operated switch 162 is provided in a shunt about switch 143a in circuit K. Closing of the switch energizes solenoid 145 which advances the shoes, and opening it retracts them.

Operation of the spray valve 111, 112 is simultaneous with rotation of drum 18. For this purpose solenoid 148, in parallel with solenoid 142, is energized when solenoid 142 is energized, and closes switches 148a, 148b, in circuit M which includes a solenoid 164 on the spray control valve.

The hand operated switch 165 in circuit G may be provided and is normally closed during operation of the apparatus, but may be opened to stop rotation of drum 18 at any desired position.

Latched in switch 138a is automatically released by the counter 105 at the end of a number of successive cures for which the counter has previously been set.

As the rail 34 is only lowered for loading uncured belts and remains stationary after each raising movement determined by setting of timer 98 the belts are stretched by equal increments between successive cures of a belt.

When belts are first tensioned on the apparatus the drum 18 is preferably rotated during the stretching operation to distribute the stretch throughout the belts. The manually operated switch 165 permits the operator to rotate the drum when desired provided the shoes 65, 66 are retracted. Also the advance and retraction of the heating shoes 65, 66 may be manually controlled by the switch 162.

As a plurality of similar belts may be cured at one time, the resulting belts are nicely matched.

The columns 12, 13 may be made as high as desired to accommodate a great range of belt lengths.

Variations may be made without departing from the scope of the invention as it is defined by the following claims.

I claim:

1. Apparatus for vulcanizing an endless band article, said apparatus comprising a rotatable drum, a stretching member including a roller arranged to engage a loop of the band, said stretching member being moveable toward and away from said drum, an arcuate shoe having a molding face for directly engaging and pressing the band against said drum, means for advancing and retracting said shoe with relation to said drum, and means effective only when said shoe is in the retracted position for rotating said drum.

2. Apparatus for vulcanizing an endless band article, said apparatus comprising a rotatable drum, a stretching member including a roller arranged to engage a loop of the band, said stretching member being moveable toward and away from said drum, an arcuate shoe having a molding face for directly engaging and pressing the band against said drum, means for advancing and retracting said shoe with relation to said drum, a spray head located adjacent said drum for spraying the peripheral surface thereof, and means effective only when said shoe is in the retracted position for operating said spray head and rotating said drum.

3. Apparatus for vulcanizing an endless band article, said apparatus comprising a rotatable drum, a stretching member including a roller arranged to engage a loop of the band, said stretching member being moveable toward and away from said drum, an arcuate shoe having a molding face for directly engaging and pressing the band against said drum, means for advancing and retracting said shoe with relation to said drum, means effective only when said shoe is in the retracted position for rotating said drum, said means comprising a motor for rotating said drum, and a timer controlling operation of said motor.

4. Apparatus for vulcanizing an endless band article, said apparatus comprising a drum rotatable about a horizontal axis, a stretching member including a roller arranged to engage a loop of said band, said stretching member being moveable vertically toward and away from said drum to stretch the band, an arcuate shoe for pressing the band against said drum, means for advancing and retracting said shoe with relation to said drum, means for moving said stretching means away from said drum in successive movements to stretch the band progressively, and means for rotating said drum in equal angular movements between movements of said stretching means.

5. Apparatus for vulcanizing an endless band article, said apparatus comprising a rotatable drum, a stretching member including a roller arranged to engage a loop of the band, said stretching member being moveable toward and away from said drum, an arcuate shoe for pressing the band against said drum, means for advancing and retracting said shoe with relation to said drum, means effective only when said shoe is retracted for rotating said drum intermittently through equal angular movements, and means for effecting successive movements of said stretching member away from said drum during successive rotative movements of said drum.

6. Apparatus for vulcanizing an endless band article, said apparatus comprising a rotatable drum, a stretching member including a roller arranged to engage a loop of the band, said stretching member being moveable toward and away from said drum, an arcuate shoe for pressing the band against said drum, means for advancing and retracting said shoe with relation to said drum, means effective only when said shoe is retracted for rotating said drum intermittently through equal angular movements, means for effecting successive movements of said stretching member away from said drum during successive rotative movements of said drum, and timing means for controlling movements of said drum, said shoe and said stretching means in sequence.

7. Apparatus for vulcanizing an endless band article, said apparatus comprising a rotatable drum, a stretching member including a roller arranged to engage a loop of the band, said stretching member being moveable toward and away from said drum, an arcuate shoe for pressing the band against said drum, means for advancing and retracting said shoe with relation to said drum, means effective only when said shoe is retracted for rotating said drum intermittently through equal angular movements, means for effecting successive movements of said stretching member away from said drum during successive rotative movements of said drum, and timing means for controlling movements of said drum, said shoe and said stretching means in a series of repeated sequential operations including overlapping pressing movements spanning the perimeter of the band.

8. Apparatus for vulcanizing an endless band article, said apparatus comprising a rotatable drum, a stretching member including a roller arranged to engage a loop of the band, said stretching member being moveable toward and away from said drum, an arcuate shoe for pressing the band against said drum, means for advancing and retracting said shoe with relation to said drum, means effective only when said shoe is retracted for rotating said drum intermittently through equal angular movements, means for effecting successive movements of said stretching member away from said drum during successive rotative movements of said drum, timing means for controlling movements of said drum, said shoe and said stretching means in a series of repeated sequential operations including overlapping pressing movements spanning the perimeter of the band, and means for discontinuing said movements at the end of the series.

9. Apparatus for vulcanizing endless band articles, said apparatus comprising a rotatable drum having peripheral grooves for receiving the articles, a stretching member including a roller mounted parallel to and having peripheral grooves in alignment with the grooves of said drum for engaging loops of said articles, said stretching means being moveable toward and away from said drum, an arcuate shoe having a molding face for directly engaging and pressing the band against said drum, means for advancing and retracting said shoe with relation to said drum, and means effective only when said shoe is in its retracted position for rotating said drum.

10. Apparatus for vulcanizing endless band articles, said apparatus comprising a rotatable drum having peripheral grooves for receiving the articles, a stretching member including a roller mounted parallel to and having peripheral grooves in alignment with the grooves of said drum for engaging loops of said articles, said stretching means being moveable toward and away from said drum, an arcuate shoe having a molding face for directly engaging and pressing the band against said drum, means for advancing and retracting said shoe with relation to said drum, means for heating said drum and said shoe, and means effective only when said shoe is in its retracted position for rotating said drum.

11. Apparatus for vulcanizing endless band articles, said apparatus comprising a rotatable drum having peripheral grooves for receiving the articles, a stretching member including a roller mounted parallel to and having peripheral grooves in alignment with the grooves of said drum for engaging loops of said articles, said stretching means being moveable toward and away from said drum, an arcuate shoe having a molding face for directly engaging and pressing the band against said drum, means for advancing and retracting said shoe with relation to said drum, means for heating said drum and said shoe, and means for rotating said drum through successive movements upon successive retractive movements of said shoe.

12. Apparatus for vulcanizing endless band articles, said apparatus comprising a rotatable drum having peripheral grooves for receiving the articles, a stretching member including a roller mounted parallel to and having peripheral grooves in alignment with the grooves of said drum for engaging loops of said articles, said stretching means being moveable toward and away from said drum, an arcuate shoe having a molding face for directly engaging and pressing the band against said drum, means for advancing and retracting said shoe with relation to said drum, means for heating said drum and said shoe, means for rotating said drum step by step, and means for advancing said stretching means away from said drum intermittently by steps arranged to take place during successive rotative movements of said drum.

URBAN C. HAREN.

REFERENCES CITED

The following references are of record in the file of this patent:

UNITED STATES PATENTS

| Number | Name | Date |
| --- | --- | --- |
| 2,325,204 | Kilborn | July 27, 1943 |